United States Patent [19]

Crawshaw

[11] Patent Number: 4,498,105
[45] Date of Patent: Feb. 5, 1985

[54] FIELD-TRANSFER CCD IMAGERS WITH REFERENCE-BLACK-LEVEL GENERATION CAPABILITY

[75] Inventor: Delbert D. Crawshaw, Lancaster, Pa.

[73] Assignee: RCA Corporation, New York, N.Y.

[21] Appl. No.: 382,423

[22] Filed: May 27, 1982

[51] Int. Cl.³ .............................................. H04N 3/14
[52] U.S. Cl. ................... 358/213; 358/221; 377/62
[58] Field of Search .............. 358/213, 221, 163; 357/24 LR; 377/62, 63

[56] References Cited

U.S. PATENT DOCUMENTS

| | | | |
|---|---|---|---|
| 3,806,729 | 4/1974 | Caywood | 250/339 |
| 3,814,849 | 6/1974 | Bucher et al. | 178/7.2 |
| 3,814,955 | 6/1974 | Itoh et al. | 307/304 |
| 3,819,953 | 6/1974 | Puckette et al. | 307/221 D |
| 3,819,954 | 6/1974 | Butler et al. | 307/221 D |
| 3,963,942 | 6/1976 | Sequin et al. | 307/221 D |
| 4,032,976 | 6/1977 | Levine | 358/213 |
| 4,232,331 | 11/1980 | Motoyama et al. | 358/221 |
| 4,293,877 | 10/1981 | Tsunekawa et al. | 358/213 |

OTHER PUBLICATIONS

Concurrently filed patent application of Peter Alan Levine, Atty. Docket No. 78,206, entitled Compensation Against Field Shading in Video From Field-Transfer CCD Imagers.

"Virtual-Phase Structure Simplifies Clocking for CCD Image Sensor", E. F. Rybaczewski, *Electronics*, 21 Apr. 1982, pp. 141-144.

*Primary Examiner*—Tommy P. Chin
*Attorney, Agent, or Firm*—J. S. Tripoli; G. E. Haas; Allen LeRoy Limberg

[57] ABSTRACT

CCD imagers of the field transfer type have field storage registers, with parallel charge transfer channels connected in cascade after respective ones of parallel charge transfer channels in their image registers. Further charge transfer channels are included in the field storage registers for use in generating reference-black-level samples.

17 Claims, 5 Drawing Figures

FIELD-TRANSFER CCD IMAGERS WITH REFERENCE-BLACK-LEVEL GENERATION CAPABILITY

The present invention relates to charge coupled device (CCD) imagers of the field-transfer type and, more particularly, to CCD imagers with the capability of generating black-level reference signals.

A CCD field transfer imager has an A register exposed to illumination and has B and C registers masked from illumination. An image is projected into the A register to generate charge packets descriptive of fields of video samples, which charge packets are shifted to the B register during the subsequent vertical retrace period. The field of video samples thus stored in the B register is shifted to the C register one line each horizontal retrace period and is then read out serially during the ensuing horizontal trace period.

It is desirable in a television camera system employing a CCD imager to obtain reference-black levels responsive solely to integrated dark current at frequently recurrent times. Such reference-black levels can be differentially combined with image-responsive signals having undesirable accompanying integrated dark current responses to obtain image-responsive signals substantially free of integrated dark current response.

The dark current response of a field-transfer type of CCD imager differs from that of other types of CCD imager. There is a "direct" component of dark current response attributable to the integration of dark current in each stage of the image register (the A register) over each integration time. However, in addition, there is a "staircase step" component of dark current response attributable to integration of dark current in the B register. That is, in each field, each successive line of image samples transferred to the C register has an incrementally larger component of integrated dark current response than the line before, owing to its having been in the B register for an additional line advance time. These "staircase step" components cause a shift in average brightness from beginning of the image field to its end, which is objectionably noticeable to a viewer of a television display generated from these video samples, particularly when substantial portions of the image have low energy level.

A CCD imager of the field transfer type which embodies the present invention includes means shielded from image illumination for producing staircase step components of integrated dark current in one or more reference black samples supplied in each line of video samples generated by the imager.

Figure 1:
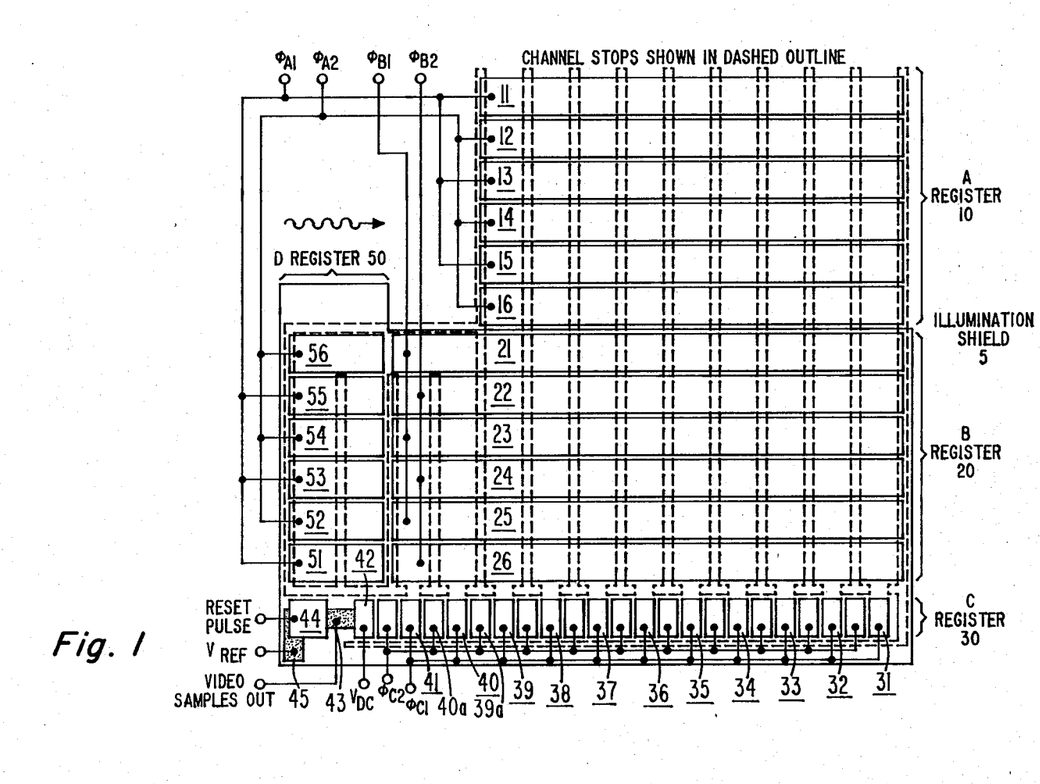
FIG. 1 is a diagram of a CCD imager embodying the present invention, wherein the charge transfer channels in which the black-level-reference pixels alongside the B register are arranged are clocked similarly to charge transfer channels in the A register.

In the FIG. 1 CCD imager an A register 10 comprises a number, m (here nine), of parallel charge transfer channels disposed in a semiconductor substrate (the surface of which is represented by the plane of the paper) between pairs of channel stops shown in dashed outline. These charge transfer channels are overlaid by a number, n (here six), of charge transfer electrodes 11, 12, 13, 14, 15, 16 which responsive to applied clocking voltages induce potential wells in the semiconductor substrate, as is well known. During image integration times, when radiant energy image is projected into the A register portion of the semiconductor substrate, clocking to these electrodes is suspended; and charge generated by photoconversion accumulates in the potential wells to form a charge pattern descriptive of an image field.

The A register is operated so that it is not shielded from illumination by the radiant energy image, at least not during field integration times. But an illumination shield 5, which may comprise an opaque mask, provides essentially complete shielding of the rest of the CCD imager, including a B register 20 and a C register 30, (as well as a D register 50 as may be used in connection with the present invention) from the radiant energy in the image projected into A register 10.

Figure 2:
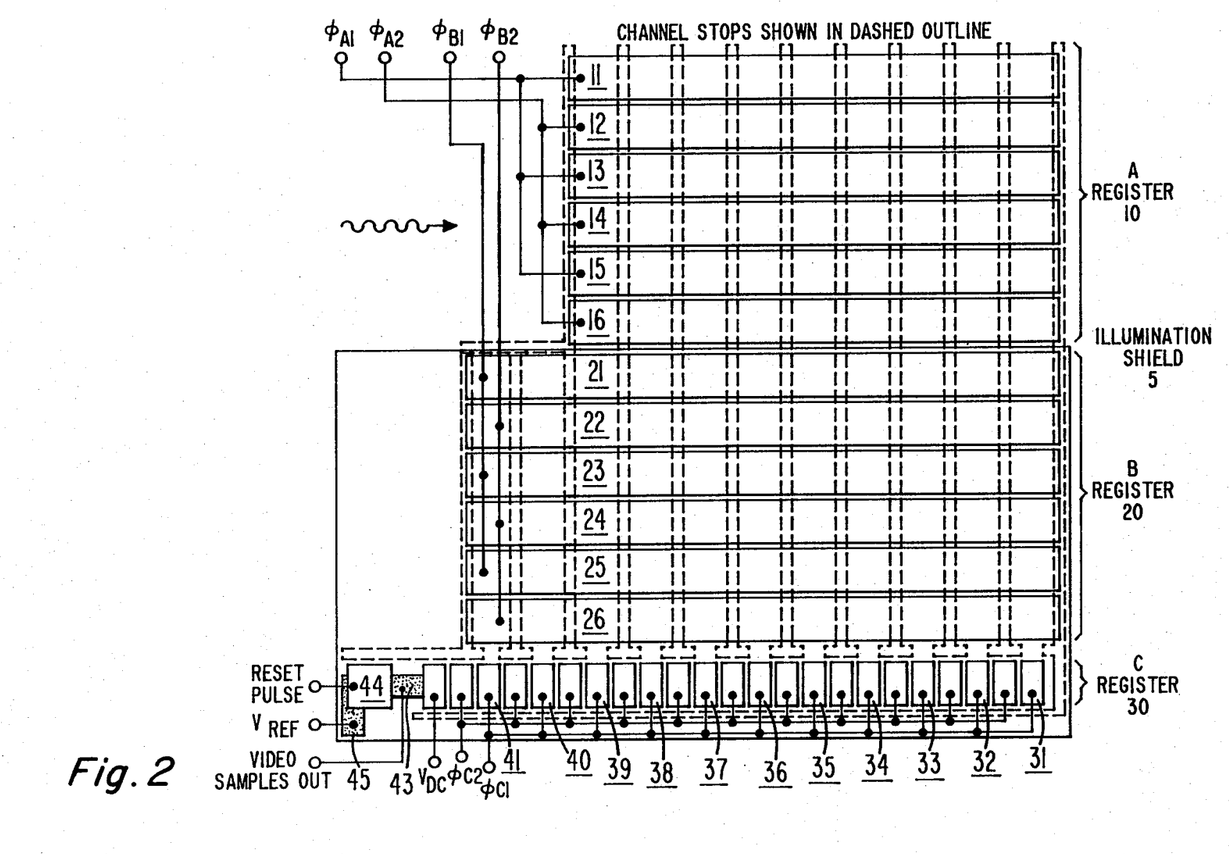
FIG. 2 is a diagram of a CCD imager embodying the present invention wherein black-level-reference pixels are omitted altogether before one or more columns of the B register.

(In a practical CCD imager, of course, the number of charge transfer channels in its A and B registers will be much greater than nine and the number of electrodes overlying each charge transfer channel in each of the registers will be much greater than six, the numbers of charge transfer channels and overlying electrode structures having been reduced in FIGS. 1 and 2 for clarity of illustration. The CCD imager may be constructed using either surface or buried charge transfer channels, and FIGS. 1 and 2 are intended to be generic, as the present invention is applicable to either type of CCD imager.)

During field transfer times (i.e., during vertical retrace in a conventional imager) the electrodes 11, 12, 13, 14, 15, 16 are supplied clocking signals in synchronism with those supplied to the B register 20 having respective charge transfer channels cascaded after those of the A register 10. This implements the transfer of the charge packets from pixel sites in the A register 10 in the downward direction as depicted in FIG. 1 to field storage sites in the B register 20. Multi-phase, two-phase or uni-phase clocking schemes may be used, per well-known practice.

FIG. 1 shows two-phase clocking using phases $\phi_{A1}$ and $\phi_{A2}$ applied to the A register during field transfer times synchronized with phases $\phi_{B1}$ and $\phi_{B2}$, respectively, continuously applied to alternate electrodes, n in number, such as 21, 22, 23, 24, 25, 26 of B register 20. Means such as the doping of the semiconductor substrate is used in the case of two-phase or uni-phase clocking, for producing assymmetrical potential wells to implement unidirectional charge transfer in the desired downward direction through the A and B registers as depicted in FIG. 1. Two electrodes per phase with dc offset between them or other known means can be used instead, for obtaining the required potential well asymmetry.

The field of video samples described by the charge packets transferred to the B register 20 is then, in the subsequent field integration time, clocked downward a line at a time during respective line retrace intervals to potential wells in the charge transfer channel of a C register 30. These storage wells are induced under electrodes 31-42, which receive the $\phi_{C1}$ phase of a two-phase clock and have between them electrodes to which the other clock phase $\phi_{C2}$ is applied for inducing transfer wells under them. The clocking of the C register is halted during each field transfer time and resumed during line trace intervals in the ensuing field integration time. The semiconductor substrate is so doped that charge transfer is in the leftward direction in the C register during the clocking of the transferred line serially, one charge packet descriptive of a pixel at a time, to a floating diffusion 43 from which sample voltages are supplied as FIG. 1 CCD imager output. Two-phase clocking with phases $\phi_{C1}$ and $\phi_{C2}$ is specifically shown, though multi-phase or uni-phase clocking may be used instead. An electrode 42 with a fixed dc potential $V_{DC}$ normally precedes the floating diffusion 43. After each sample has been clocked forward to floating diffusion 43 and sensed, the floating diffusion 43, considered as the source diffusion of an MOS transistor, is clamped, responsive to gate electrode 44 receiving a reset pulse, to the reference voltage level $V_{REF}$ applied by ohmic contact to a drain diffusion 45. (The leftward direction of transfer in the C register assumes a front-illuminated CCD imager, taking into account the perversion of the lens projecting the image into the A register, but the direction of scan in the C register can be reversed to accommodate back illumination of the A register.)

An output can be taken from the C register by means other than the floating diffusion, without interfering with operation of the invention still to be described in detail. As a first example, the floating gate electrode of a source-follower field effect transistor may be used to sense charge amplitude in a left-end well of the C register. As a second example, output can be taken from the drain diffusion 45 across a load resistor interposed between it and the $V_{REF}$ supply; such output will contain response to the integrated dark current samples with some low-pass filtering which will not interfere with operation in accordance with the invention.

The CCD imager as thus far described operates like known imagers. It is desirable that one or more stages of the C register receive reference-black-level samples for insertion into the video signal at the beginning of a scan line. A plurality of reference-black-level samples may be desired to extend the time reference-black-level is available; this allows the dc restoration provided by clamping of black reference samples to have a long enough time constant to easily distinguish against transient spikes associated with remnants of clocking signal, etc.

The inventor's co-workers have experimented with generating the reference-black-level samples by masking one or more columns along one or the other of the sides of the A register. Ideally, pixel sites in these columns would not receive any portion of the image projected into the A register, so their response to the integration time of an image field should provide the "direct" component of reference black level.

These experiments ended in failure. It was found that some portion of the radiant energy in the image projected into the unmasked portion of the A register found its way past the mask and caused substantial error in reference black level. Reference black level undesirably would change as the f-stop of the camera optics was varied. Lens flare would cause reference-black-level errors over groups of lines and subsequent dc restoration would cause horizontal banding of the picture. These problems are particularly bothersome when the A register is "back-illuminated"—i.e., when the radiant energy image is projected into the surface of the CCD imager through the surface opposite to that on which the electrode structure is disposed. What is desired is generating a reference-black-level sample in each line of video signal primarily responsive to integrated dark current alone and not to charge generated by photoconversion of radiant energy.

In the FIG. 1 embodiment of the invention the black-level-reference charges are supplied via the two leftmost charge transfer channels of the B register 20 (that under the connections of $\phi_{B1}$ and $\phi_{B2}$ clock lines to the B register electrodes 21–26 and that just to its left). The "staircase step" components of the reference black level samples originate in these charge transfer channels. The "direct" components of black-reference-level charges are supplied to the top stages of the two leftmost charge transfer channels of the B register during field transfer time from charge transfer channels alongside the B register, in what is labelled D register 50. D register 50 is shielded from light by an illumination shield—here, the illumination shield 5 which also shields B register 20 and C register 30. The charge transfer channels in the D register underlie electrodes 51–56 which are clocked by the same clock phases, $\phi_{A1}$ and $\phi_{A2}$, used to clock the A register. The D register 50 is arranged for propagation of charge through each of its charge transfer channels in an upward direction during the field transfer times, rather than in a downward direction; this is done by sequence of phasing in a multi-phase clocking arrangement and is usually done by selective doping in the semiconductor substrate under the electrode structures in uni-phase and two-phase clocking arrangements. The D register 50 is close enough to the A register 10 that the operating temperatures of these registers are nearly the same, owing to the high thermal conductivity of the silicon substrate. So the dark current per storage well generated in the D register is substantially the same as the dark current per storage well generated in the A register, as desired.

In operation, during an integration time, dark currents integrate beneath the two columns of the D register. It is assumed that $\phi_{A1}$ is "high"—is the integrating voltage—and $\phi_{A2}$ is off, the charge integration takes place under electrodes 51, 53 and 55 of the D register. These are dc components of dark current and the integration in the D register is analogous to the integration of dark currents in the A register. During vertical retrace, when $\phi_{A1}$ and $\phi_{A2}$ are on and operate synchronously with $\phi_{B1}$ and $\phi_{B2}$ to shift an integrated field from the A to the B register, the integrated dark currents in the D register are shifted upward through the D register and then downward into the leftmost two columns of the B register, as the charges previously in the B register are shifted downward into the C register. Thus, for example, assuming charges integrate beneath electrodes 51, 53, and 55, the charge under 51 will shift successively to beneath 52, 53, 54 and so on, and the charges ahead of (above) 51 will be shifted up correspondingly. At electrode 56, the charges in the two columns of the D register merge at $\phi_{A2}$ time. Note that there is no channel stop beneath electrode 56. During the following $\phi_{B1}$ time, the charge beneath electrode 56 shifts to the right to beneath electrode 21 and is confined above the leftmost two channels of the B register.

(Note the channel stop which extends from above electrode 39a through the B register to the left edge of the A register; and note that the channel stop above electrode 40a, while it extends beneath electrode 22, terminates before it reaches electrode 21.) During the following $\phi_{B2}$ time, the charge splits into two during its shift to beneath electrode 22. One-half the charge goes to the furthest left channel of the B register and the other half to the channel immediately to its right.

The charges in the two leftmost channels of the B register are shifted downward in response to $\phi_{B1}$, $\phi_{B2}$ until they reach the C register. During the integration time in the A register, these charges (when in the D register) reach a magnitude corresponding to the dc dark current component. While shifting downward in the B register, these charges accumulate the staircase component of the dark current just as do the image component charges as they shift in the remainder of the B register.

When each pair of charge packets in the leftmost two columns, respectively, of the B register reach the substrate regions beneath electrode 26 (in response to $\phi_{B2}$) they are then shifted into the C register. This occurs in response to $\phi_{C1}$, the charge in the leftmost column shifting to beneath electrode 41 and the charge in the column to its right shifting to beneath electrode 40. At this time then ($\phi_{C1}$ time) there is stored in the C register one row of image component charges (beneath electrodes 31-39), and ahead of them, two dark current charge packets beneath electrodes 40 and 41, respectively. This row of charges subsequently is transferred out of the C register via floating diffusion 43, in response to $\phi_{C1}$, $\phi_{C2}$ during a horizontal trace period. The two dark current packets may be stored and used in the manner described briefly previously and discussed in more detail later.

While in the arrangement described, charge is merged at 56 and then split in half, other approaches are possible. Charge can be shifted up D register and then down the B register in a single column and split as it enters the C register. Also, charge may be kept separate in two channels at all times. Using charge merging, followed by charge splitting as in FIG. 1 avoids some circuit complexity as would be required for separate 180° channel turns (such as arranging to leave CCD circuitry and then re-enter CCD circuitry, or such as using special 180° turn structures involving diffusions or more complex electrode configurations). Since the charges in the two black-reference-level channels arise solely from integrated dark current, they are similar and merging then splitting does not introduce errors. While for illustration two dark current packets are employed per row, this is not essential as there may be only a single such packet or, if desired, more than two packets per row.

Other arrangements for shifting charge packets from reference-black-level generating pixel sites beside the B register into the B register itself are possible, but they are generally more complex than the arrangement of FIG. 1. For example, where only one column of reference-black-level samples is to be clocked through the B register on either or each of its left and right sides, samples of dark current integrated over a field integration time may be side-loaded—i.e., shifted in parallel—into the column. Such side-loading would be analogous to that used for loading the C register from the B register. As another example, the D registers and the portion of the B register to which it supplies integrated dark current samples can be relocated to below the C register, so their charge transfer channels for the most part parallel those of the C register. A reference-black-level sample generating scheme that permits a still simpler CCD imager structure than that of FIG. 1 is desirable.

The FIG. 2 CCD imager simply uses the two leftmost columns of the B register 20 clocked with $\phi_{B1}$, $\phi_{B2}$ to generate just the "staircase" component of the black reference levels. During a field transfer interval these columns are cleared of integrated charge, as the lines of integrated charge in the B register are clocked forward into the C register, to make room for the lines of the field of image related charge packets transferred from the A register to other columns of the B register. The charge clocked into the C register during field transfer intervals is shifted to the end of the C register. This charge may then be discarded or alternatively it may be integrated to develop a measure of the direct component of reference black level.

The B-register-to-C-register transfers during line retrace intervals in the ensuing integration time advance a line of charge packets, part of each which line consists of the charge packets from the leftmost two columns of the B register which are not preceded by charge transfer channels of another register. Each such charge packet is composed of dark current integrated by the number of line advances that charge packet has been through during its downward passage through the B register. That is, the charge packets generating reference-black-level samples in the first line are relatively small, and those in the last line are relatively large.

Similar operation can be achieved in a conventional field-transfer CCD imager having the same number of columns in its A and B registers, by arranging to block the passage of charge from the A register to the B register in selected columns. This can be done by applying appropriate voltages to gate electrodes overlying selected columns of the last row (or last few rows) of the A register so as to cause charge to spill into drain structures, for example. Or a channel stop can be interposed between the A and B registers in the selected columns.

If the "staircase" component of black-reference-level samples supplied by the FIG. 1 CCD imager is integrated over a field integration time, the integral obtained will be half as large as that provided by integrating the "direct" component of the black-reference samples over the field integration time. This is because the "direct" component is generated by charge packets remaining in the A register for a complete field integration time while the "staircase" component is generated by charge packets that, on average, remain in the B register for only half a complete field integration time. This fact can be used as the basis for generating the "direct" component of black-reference-level in a video camera using the FIG. 2 CCD imager.

Figure 3:
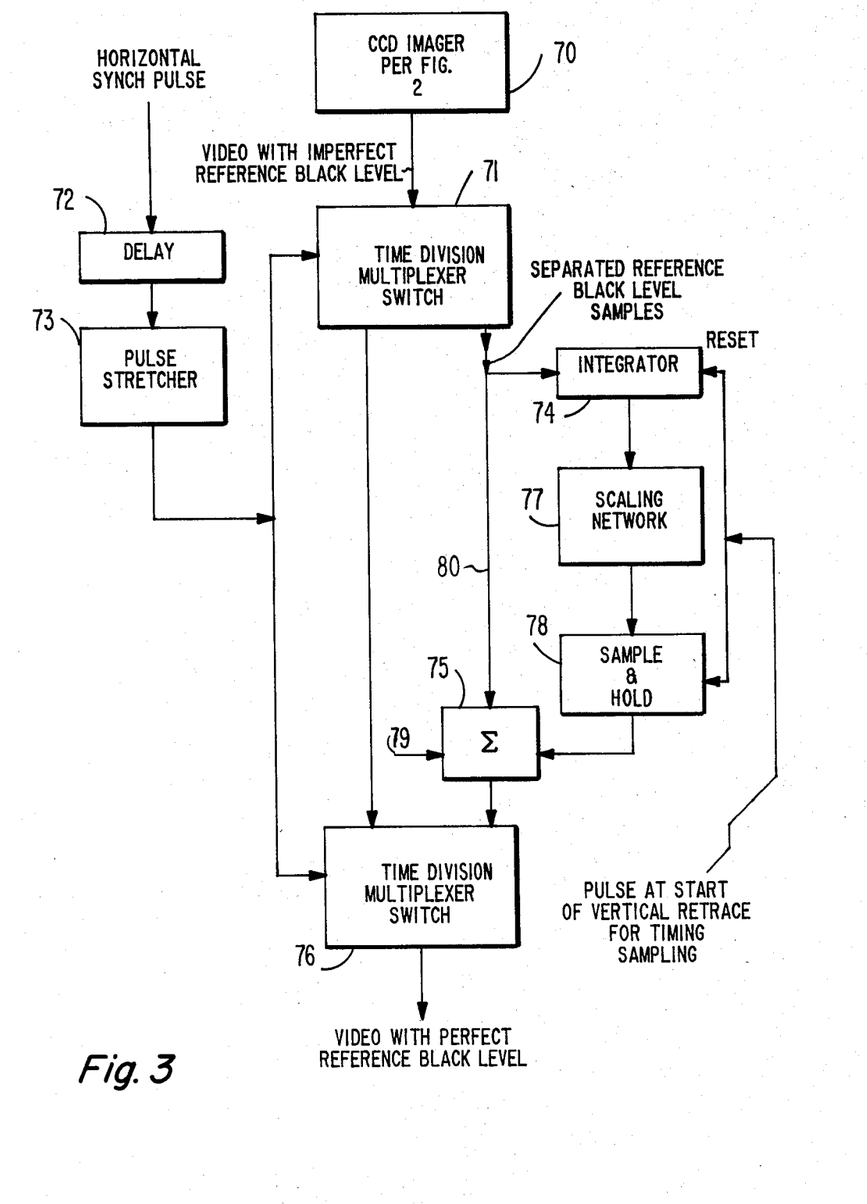
FIG. 3 is a block diagram of apparatus to be used with the FIG. 2 CCD imager to obtain video signals with corrected reference-black-level samples in each line.

FIG. 3 illustrates how this may be done. The reference-black-level samples in the stream of samples issuing forth from CCD imager 70, which is of the type shown in FIG. 2, are separated from the remaining samples using a time-division multiplexer switch 71. Signals for controlling switch 71 can be developed as shown, for example, proceeding from the horizontal synch pulses from the camera time base generator (not shown), using a delay circuit 72 and pulse stretcher circuit 73 to develop pulses synchronous with CCD imager 70 supplying black-reference-level samples. Separated reference-black-level samples are integrated over field integration time by integrator 74. The samples are also applied via lead 80 as input to a linear combining circuit 75. Here they are added to the "direct" component of black-reference level from the preceding field integration time, as derived using integrator 74, scaling network 77 and sample-and-hold circuit 78, as will be described in greater detail below. A time-division-multiplexer switch 76, switching synchronously with time-division-multiplexer switch 71, reassembles the video samples with missing reference-black-level samples supplied from TDM switch 71 and the corrected reference-black level samples supplied from linear combining circuit 75, to generate a stream of samples similar to that obtainable from the CCD imager of FIG. 1.

During this field integration time the two separated reference-black-level samples are integrated by integrator 74. So at the end of field integration time, when field transfer and vertical retrace are to occur, the integral will be twice the integrated "staircase" component of each of the two reference-black-level samples per line and should be in known proportion to the "direct" component of reference black level as integrated over a field integration time. Integrator 74 output is scaled to equal the "direct" component of a single reference-black-level sample by a scaling network 77. A pulse, occurring at the start of the time when field transfer in the CCD and vertical retrace are to occur, commands a sample-and-hold circuit 78 to store this level of "direct" component from scaling network 77. This is the level of "direct" component supplied as the other of the inputs to linear combining circuit 75, to be added to its input from time-division-multiplexer switch 71. The same pulse that commands sample-and-hold thereafter resets integrator 74 for zeroing its output.

The technique of correcting reference-black-level samples just described can be carried out in a digital, rather than analog, basis. In such case an analog-to-digital converter will be inserted between the CCD imager 70 and the time-division-multiplexer switch 71. An additional black level control component may be applied, as well, to a further input 79 of the linear combining circuit 75. These black level control components may be used in adjusting contrast conditions in the video camera, for example, or in securing black level variation responsive to image brightness.

As noted above, the direct component of reference-black level can be obtained by using integrator 74 to integrate the charge transferred out of the C register during field transfer interval rather than the separated reference-black level samples from TDM switch 71.

Where full dc restoration is not going to be used in the camera chain anyway, but average black level or partial dc restoration is to be used instead, there will be no need to generate the "direct" component of reference-black-level. The dc restoration can proceed simply by clamping to just the "staircase" component of reference-black-level supplied from the FIG. 2 CCD imager output during times close to line retrace. This will provide dc restoration that suppresses the staircase component of integrated dark current in pixel samples in the video signal. This removes the relative difference in average brightness as between the bottom and top halves of the image, otherwise caused by integrated dark current variations.

Figure 4:
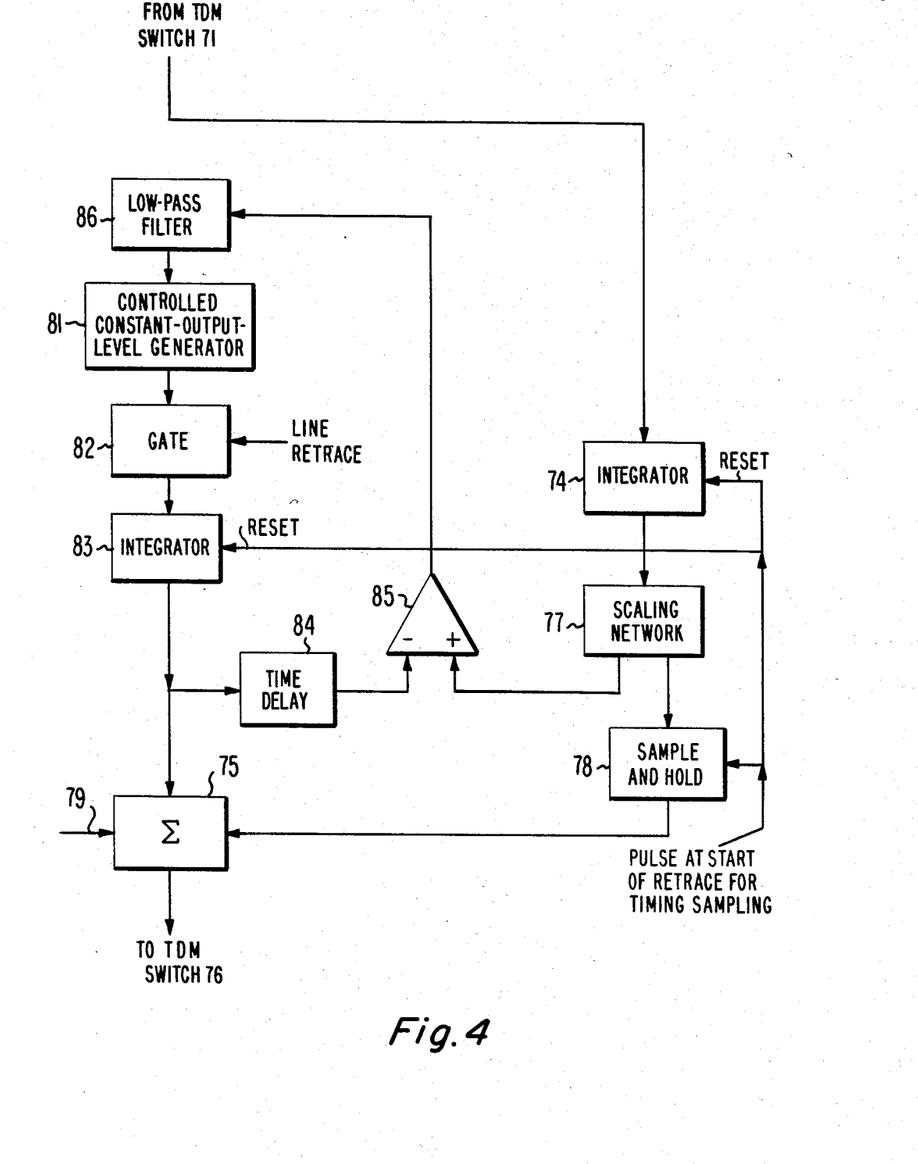
FIG. 4 is a block diagram of a modification that can be made to the FIG. 3 apparatus.

FIG. 4 shows circuitry that may replace that circuitry between the righthand output of TDM switch 71 and the righthand input of TDM switch 76 in FIG. 3. Using the black-reference samples directly as supplied line-by-line from CCD imager 70 and routed through TDM switch 71 as an input of summation circuitry 75, as was done in FIG. 3, can lead to line-by-line brightness variations with some CCD imagers—particularly those where only one column of B register is used for generating black-reference samples. This is attributable to stage-to-stage differences in dark current generation characteristics in this one column of the B register being insufficiently integrated out in determining reference-black level for each line. The solution to this problem is to provide low-pass filtering in the column or columns of the B register in which reference-black-level samples are originated. While CCD structures for doing this in the imager are possible, in the interests of simpler CCD imager structure it is preferable to use transversal filtering of the imager C register output. This transversal filtering may be done using comb filtering of the reference-black-level samples, for example.

FIG. 4 shows the transversal filtering taking another form which uses the integrator 74 used to generate compensation against dark current integration in the A register. A controlled constant output level generator 81 has its output selectively applied, during line retrace, via a gate 82 to the input of an integrator 83 to generate a staircase waveform. Integrator 83 is reset by the pulse at start of vertical retrace that resets integrator 74, to define the beginning of the staircase waveform. This staircase waveform is continuously summed with the output of sample-and-hold circuit 78 to supply the right-hand input of FIG. 3 TDM switch 76. This staircase waveform, as delayed by a time delay circuit 84 to compensate for the time between line retrace and the timing of the reference-black-level samples, is differentially combined in differential-input amplifier 85 with an output of scaling network 77 proportional to integrator 74 output. The output of differential-input amplifier 85, indicative of the difference between the generated staircase and the staircase provided in response to integrator 74 integrating reference-black-level samples, is passed through a low-pass filter with a time constant of at least several lines to generate an error signal. This error signal is then applied to controlled constant output level generator 81 to complete the degenerative feedback loop that regulates the level of its output. The time constant of low-pass filter 86 is the time constant of the transversal filtering the FIG. 4 circuitry provides for the columns of the B register used to generate reference-black-level samples.

Where integrator 83 is of a type that integrates charge on a capacitor therein, controlled constant output level generator 81 may be a controlled constant output level generator, for example. (The terms "constant level" and "constant current" respective to generator 81 refer to its output level being independent of its load, not to its output level being invariant.)

Variations of the CCD imagers shown in FIGS. 1 and 2 wherein the charge transfer channels used in generating reference-black-level samples are located below and parallel to the C register are possible, as will be apparent to a CCD designer. Variations of the CCD imagers shown in FIGS. 1 and 2 having a plurality of C registers as will enable single-chip color-camera operation (e.g., similar to the color imager described by P. K. Weimer in U.S. Pat. No. 4,001,878 entitled CHARGE TRANSFER COLOR IMAGERS and issued Jan. 4, 1977, but modified to include reference-black-level sample generation per the present invention) are, of course, possible.

Figure 5:
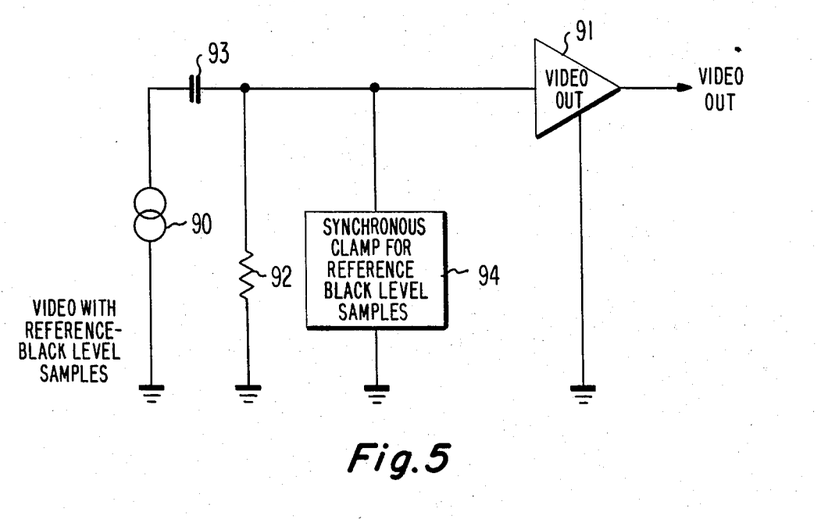
FIG. 5 is a schematic diagram, partially in block form, of dc restoration apparatus for use in connection with the invention.

FIG. 5 shows dc restoration apparatus as may follow the CCD imagers of FIGS. 1 and 2, or the FIG. 3 circuitry, or the FIG. 3 circuitry modified per FIGURE 4. The preceding imager, FIG. 3 circuitry, or FIG. 3 circuitry modified per FIG. 4 is considered to comprise the voltage source 90 in FIG. 5. Source 90 supplies a stream of video samples interspersed with reference-black-level samples ac-coupled to the input circuit of a video amplifier 91. More particularly, the ac-coupling is resistive coupling via resistor 92, with a dc-blocking capacitor 93. The time constant of resistor 92 and capacitor 93 is long compared to a line of video. Synchronous clamp 94 clamps the input circuit of video amplifier 91 to ground or other fixed direct potential, synchronous to the occurrence of reference-black-level samples. The clamp 94 is sufficiently low resistance that capacitor 93 is charged to a level that suppresses integrated dark current components from the video supplied the input connection of video amplifier 91.

What is claimed is:

1. In a charge-coupled-device imager of the field transfer type, having an A register of parallel charge transfer channels for accumulating packets of charge at pixel sites responsive to the illumination of the charge transfer channels in said A register during integration times, having a B register of parallel charge transfer channels preceded in cascade connection by respective ones of the parallel charge transfer channels in said A register, to which charge transfer channels in the B register said packets of accumulated charge are transferred from said A register during field transfer times between said integration times, and from which charge transfer channels in said B register successive lines of those charge packets are clocked forward a line at a time during said integration times, having a C register functioning as a parallel to serial converter for successive lines of each field as they are clocked forward from the B register, thereby to form a video signal; and having means for shielding the B and C registers from illumination, the improvement for generating a reference-black-level sample in each line of said video signal responsive primarily to integrated dark currents alone and not appreciably to charges generated by photoconversion, comprising:

at least one further charge transfer channel being shielded from illumination, being of equal length with each of the charge transfer channels in said B register, being clocked in synchronism with the charge transfer channels in said B register and having a final stage connected to supply to said C register charge packets representative of said reference-black-level samples which charge packets are generated at least in part by accumulation of dark current in said at least one further charge transfer channel, 2. An improved charge-coupled-device imager as set forth in claim 1 wherein each said at least one further charge transfer channel is preceded in cascade by a respective charge transfer channel, which is of the same length as similarly clocked charge transfer channels in said A register, and which has means for shielding its entire length from illumination.

3. An improved charge-coupled device imager as set forth in claim 1 where said at least one further charge transfer channel receives substantially no charge except for integrating dark current internally generated therein.

4. An improved charge-coupled device imager as set forth in claim 2 or 3 wherein all the charge transfer channels in said B register are physically arranged in parallel with each other and with each said at least one further charge-transfer channel.

5. An improved charge-coupled-imager as set forth in claim 2 wherein each further charge transfer channel in said B register and its preceding charge transfer channel are physically arranged in parallel with each other and with the other charge transfer channels in the B register, and are connected in cascade by means for turning around the direction of forward transfer of charge from its preceding charge transfer channel to said each futher charge transfer channel in said B register.

6. A CCD imager of the field transfer type which includes A, B, and C registers and which, in operation, produces a direct component of integrated dark current accompanying charge packets generated in the A register during the integration portion of each field time responsive to illumination by radiant energy image, and produces a staircase component of integrated dark current in charge samples transferred through the B register during respective succeeding field times, said CCD imager being improved in that means are provided to generate reference-black-level charges for inclusion in the output from the C register of said CCD imager, which means is non-responsive to said radiant energy image and includes:

first means shielded from illumination for producing reference integrated dark current components during the transfer of charge packets through said B register during each field time, each said component having a value of charge directly dependent on the duration of time from the beginning of said field time to the time of its production; and first charge introduction means for introducing at least one such reference charge component into the C register during each shifting of charge packets from the B to the C register, each said introducing being into a stage of the C register separate from those receiving the A-to-B-to-C-register transfers of charge packets.

7. An improved CCD imager as set forth in claim 6, further including:

second means shielded from illumination for producing integrated dark current charge components during the duration of the integration portion of each field time; and second charge introduction means for introducing a respective one of these components into each said separate stage of said C register such that they are additively combined with charge component introduced by said first charge introduction means.

8. A CCD imager of the field transfer type which includes A, B, and C registers and which, in operation, produces direct components of integrated dark current accompanying the charge samples accumulated in the A register during the integration portions of each field time, and produces staircase components of integrated dark current in successive lines of the charge samples as they are retained in the B register during the B-register-to-C-register transfers of charge, said CCD imager being improved to include:

means shielded from illumination for producing reference direct integrated dark current component charge packets during the integration of charge in the A register;

at least one extra channel included in said B register and shielded from illumination, said extra channel being arranged not to receive charge packets from said A register during the A-to-B-register transfer of charge; and means for transferring said reference direct integrated dark current component charge samples into each stage of each said extra channel during the A-to-B- register transfer of charge packets.

9. A combination of charge-coupled device imager with an improvement for suppressing an undesirable black level error cumulative during successive lines—wherein said charge-coupled-device imager is of the field transfer type having a A register of parallel charge transfer channels for transferring packets of charge accumulated at pixel sites of fields during integration times responsive to photoconversion of light energy falling on the A register, having a B register of parallel charge transfer channels to which said packets of accumulated charges are transferred from said A register during field transfer times between said integration times and from which charge transfer channels in said B register successive lines of those charge packets are clocked forward a line at a time during said integration times, having a C register functioning as a parallel-to-serial converter for successive lines of each field as they are clocked forward from the B register, and having an illumination shield for the B and C registers, said charge coupled imager supplying video samples from the output of its C register responsive to said packets of accumulated charges, said video samples having a direct component owing to the integration of dark current in the charge transfer channels of said A register during integration times, and said video samples further having an undesirable black level error cumulative during successive lines owing to integration of dark current in the charge transfer channels of its B register—and wherein said improvement comprises:

means included at least in part within said charge-coupled-devide imager integrating dark current cumulatively with each line advance for generating at least one reference-black-level sample for each line, which sample is independent of charges generated by photoconversion; and means for interleaving in time each said reference-black-level sample generated for a line with a line of said video samples to which its corresponds, so as to precede the video samples in each line with similar integrated dark current components owing to integration of dark current in the charge channels of said B register.

10. A combination as set forth in claim 9 including:

a video amplifier, having an input circuit to which the interleaved samples are ac-coupled, and having an output circuit for responding with a stream of output samples; and means for clamping the input circuit of said video amplifier to fixed level synchronous with the occurrence of reference-black-level, thereby to suppress said undesirable black error in the stream of output samples from said video amplifier.

11. A combination as set forth in claim 10 wherein said charge-coupled device further includes:

means for integrating dark current over each integration time; and means for augmenting each reference-black-level sample with that integral.

12. A combination as set forth in claim 9 including:

means for integrating said reference-black-level samples supplied over each integration time; and means combining each integral thus obtained with the reference black level samples supplied in the succeeding integration time for compensating against the direct component of integrated dark current in said video samples.

13. A combination as set forth in claim 9 or 12 including:

means for transversely filtering said reference-black-level samples with a time constant several lines long.

14. A CCD imager of the field transfer type which includes A, B, and C registers which, in operation, produces direct components of integrated dark current accompanying the charge samples accumulated in the A register during the integration portions of each field time, and produces staircase components of integrated dark current in successive lines of the charge samples as they are retained in the B register during the B-to-C-register transfers of charge, said CCD imager being improved to include:

at least one extra channel shielded from light included in said B register, said extra channel being arranged not to receive charge from said A register during the A-to-B-register transfer of charge, said extra channel being used for integrating dark currents during the B-to-C-register transfers of charge and for shifting these dark current charges to the C register concurrently with shifting of each row of charge from the remainder of the B register to the C register.

15. A CCD imager as set forth in claim 14 including:

means for transferring said reference direct integrated dark current component charge samples into each stage of each said extra channel during the A-to-B-register transfer of charge.

16. A CCD imager as set forth in claim 14 in combination with:

means for transferring said reference direct integrated dark current component charge samples into each stage of each said extra channel during the A-to-B-register transfer of charge.

17. A combination of charge-coupled device imager with an improvement for suppressing an undesirable black level error cumulative during successive lines—wherein said charge-coupled-device imager is of the field transfer tvpe, having an A register of parallel charge transfer channels for transferring packets of charge accumulated at pixel sites of fields during integration times responsive to photoconversion of light energy falling on the A register, having a B register of parallel charge transfer channels to which said packets of accumulated charges are transferred from said A register during field transfer times between said integration times and from which charge transfer channels in said B register successive lines of those charge packets are clocked forward a line at a time during said integration times, having a C register functioning as a parallel-to-serial converter for successive lines of each field as they are clocked forward from the B register, and having an illumination shield for the B and C registers, said charge coupled imager supplying video samples from the output of its C register responsive to said packets of accumulated charges, said video samples having a direct component owing to the integration of dark current in the charge transfer channels of said A register during integration times, and said video samples further having an undesirable black level error cumulative during successive lines owing to integration of dark current in the charge transfer channels of its B register—and wherein said improvement comprises:

at least one further charge transfer channel located in said CCD imager, shielded from illuminated and clocked in unison with said parallel charge transfer channels of the B register which it is the same in length as, for integrating dark current cumulatively with each line advance;

means responsive to said cumulatively integrated dark current for generating a refrence-black-level sample for each line; and means for differentially responding during each line to said video samples and to said reference-black-level sample to provide a video signal with substantially reduced black level error cumulative during successive lines.

* * * * *